United States Patent [19]
Hughes

[11] Patent Number: 5,875,444
[45] Date of Patent: Feb. 23, 1999

[54] COMPUTER FILE SYSTEM CHECK AND REPAIR UTILITY

[75] Inventor: Sarah Blodgett Hughes, Round Rock, Tex.

[73] Assignee: International Business Machines Corporation, Armonk, N.Y.

[21] Appl. No.: 762,909

[22] Filed: Dec. 10, 1996

[51] Int. Cl.$^6$ .................................................. G06F 17/30
[52] U.S. Cl. .................................................. 707/2; 707/1
[58] Field of Search .................................. 707/1, 2, 3, 4, 707/5, 6, 7, 8, 9, 10, 100, 200, 201, 205, 500; 364/222.81, 280, 282.1, 282.2, 282.3, 282.4

[56] References Cited

U.S. PATENT DOCUMENTS

| | | | |
|---|---|---|---|
| 5,151,989 | 9/1992 | Johnson et al. | 707/10 |
| 5,371,885 | 12/1994 | Letwin | 707/205 |
| 5,388,257 | 2/1995 | Bauer | 707/1 |
| 5,412,808 | 5/1995 | Bauer | 707/1 |
| 5,504,883 | 4/1996 | Coverston et al. | 707/202 |
| 5,627,996 | 5/1997 | Bauer | 395/500 |
| 5,642,501 | 6/1997 | Doshi et al. | 707/8 |
| 5,666,532 | 9/1997 | Saks et al. | 707/205 |

OTHER PUBLICATIONS

Bina, Eric, et al., "A Faster *fsck* for BSD UNIX™," Center for Supercomputing Research and Development, University of Illinois at Urbana–Champaign, Winter '89, pp. 173–185.

*Primary Examiner*—Thomas G. Black
*Assistant Examiner*—Ruay Lian Ho
*Attorney, Agent, or Firm*—Jeffrey S. LaBaw; David H. Judson

[57] ABSTRACT

A method of maintaining a file system of a computer in a known correct state begins by reserving a workspace in the file system itself. Upon a predetermined occurrence, file system organizing data structures are examined to determine and store in the workspace information reflecting a current state of the file system. The information preferably includes an inode table that identifies a status of each inode in the file system and a block map that maps all data blocks that are in use. The inode table is used verify the correctness of the root directory tree and that all in-use inodes are connected. Use of the inode table obviates recursive traversal of the inodes to verify the root directory and thus saves considerable processing time. Processor memory is not being used to support the current state information, eliminating the requirement for processor memory in proportion to file system size. After checking, the current stat is adjusted to the known correct state.

19 Claims, 9 Drawing Sheets

COMPUTER FILE SYSTEM CHECK AND REPAIR UTILITY

TECHNICAL FIELD

The present invention relates generally to file system maintenance in a computer and more particularly to a file system check and repair utility that exhibits short execution time without requiring prohibitive amounts of processor memory.

BACKGROUND OF THE INVENTION

Computer systems typically include mass storage devices configured as a "file system." Mass storage devices include hard drives, optical disk drives, magnetic tape drives, solid state disk drives and bubble memories. Software routines for maintaining such a file system are known in the art as "check and repair" utilities. For example, in the UNIX Operating System, a utility called "fsck" is used to verify control information and the directories of the file system after an unscheduled event such as a power outage. The "fsck" command bypasses standard file access methods and compares directory and control information in an effort to identify any disk blocks or control structures (known as inodes) that are not accounted for within the file system. Errors in the state of the file system are then addressed in an attempt to return the system to a known correct state. A similar routine, called "chkdsk" is used in DOS-based systems.

When a check and repair operation is carried out, normal file system access cannot take place. As a result, prior art check and repair utilities are quite cumbersome on systems having a large amount of mounted disk storage and/or that are required in "mission critical" operating environments. The "fsck" utility uses a small amount of processor memory for a workspace, but it runs very slowly because it makes multiple passes, even on a correct file. It is thus much too slow for use with very large file systems or for time-sensitive computer environments that must be up and running 24 hours a day, seven days a week. The "chkdsk" utility runs more quickly, but it uses too much memory in proportion to file system size to be useful for such large systems or in mission critical environments.

Thus, file system check and repair techniques currently available in the marketplace always impose compromises in that they are either too slow or require too much memory. As a result, it has not been possible to scale these routines and provide efficient check and repair functionality over a wide range of processor, memory and file system operating requirements, or to provide adequate "mission critical" response rates.

There is therefore a long felt need in the marketplace for a file system check and repair utility that solves these and other problems of the prior art.

BRIEF SUMMARY OF THE INVENTION

It is a primary object of the invention to provide an improved computer file system check and repair utility.

It is another primary object of the invention to optimize a computer file system check and repair operation for short execution time and without requiring prohibitive amounts of processor memory.

It is still another primary object to provide a file system check and repair utility that is scaleable to any size file system even as the file system storage capacity increases.

It is yet another significant object of the invention to support state information useful in file system check and repair in a relatively small, dedicated portion of the file system itself.

It is still another more specific object of the invention to verify the connectedness of file system directory structures without recursive traversal of a root directory tree.

It is yet another object of the present invention to provide a check and repair utility that verifies and repairs file system inode management and block usage structures.

A more general object of the invention is to provide a computer file system check and repair utility that is useful in mission critical operating environments.

These and other objects are provided in a method of checking and repairing a file system of a computer upon a predetermined occurrence such as a hard stop or system power outage. The file system is defined by a root directory tree and a set of organizing data structures such as inodes and data blocks. The "inode" convention refers to a control structure representing a file, directory or link in the file system. The method preferably begins reserving a workspace in the file system for file system check and repair. Upon the predetermined occurrence, the organizing data structures are examined to determine and store in the workspace information reflecting a current state of the file system. The information includes a workspace inode table, which identifies a status of each inode in the file system, and a workspace block map, which identifies all data blocks in use. According to the method, the workspace inode table is then used to verify the correctness of the root directory tree and that all in use inodes are connected. Use of the workspace inode table to verify directory structures obviates recursive traversal of the root directory tree, which would otherwise require intensive I/O operations that are time-consuming and processor-intensive. The method then makes any necessary repairs to damaged inodes or other organizing data structures to return the file system to a known correct state.

According to the invention, the size of the workspace is adjusted as the size of the file system changes. The check and repair utility uses the workspace to help minimize processing time. As a result, the utility is scaleable to a wide range of file systems and/or processors in the marketplace and is useful for mission critical computer operations.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
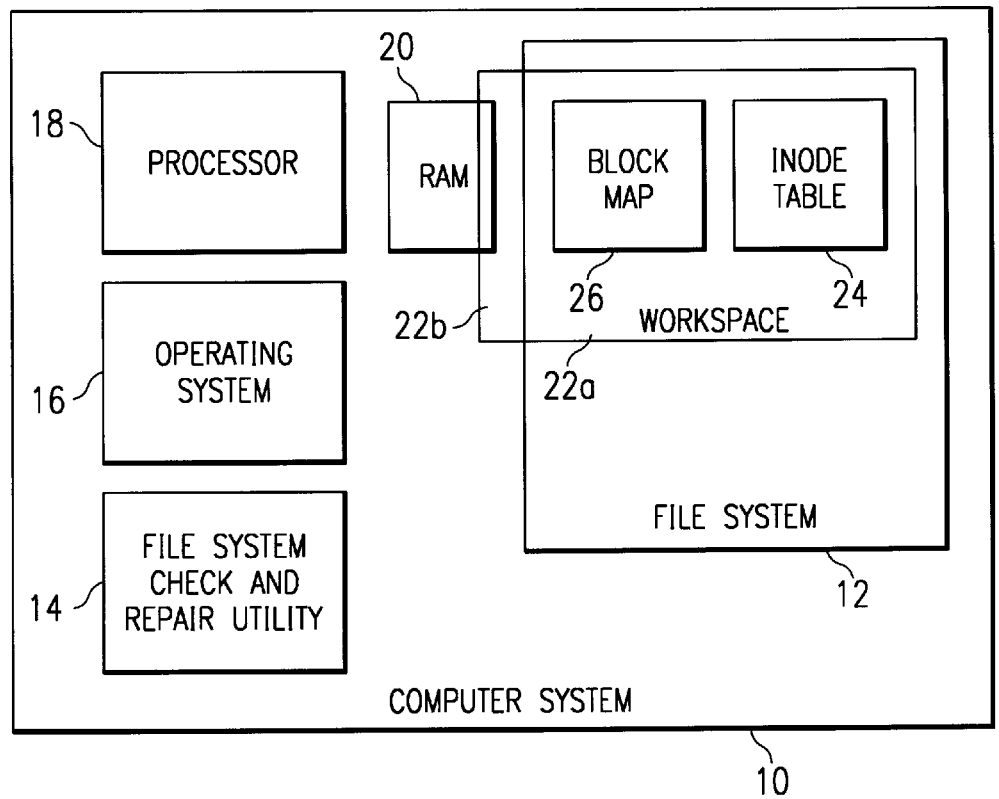
FIG. 1 illustrates a computer system in which the present invention is implemented.

Referring now to FIG. 1, the present invention provides a new file system check and repair utility for a computer system 10. The computer system typically provides multi-user, multi-tasking operation, although the invention may be implemented in any type of computer. System 10 includes a file system 12 having, for example, mounted disk storage. The file system check and repair utility 14 is preferably implemented in software and is run by the operating system 16, under the control of processor 18, all in a known manner. The processor has a memory 20 for supporting the operating system, application programs and data.

According to the invention, it is desired to reserve a portion 22a of the file system 12 as the primary "workspace" for the file check and repair utility. The workspace is not used by any other file system process and is thus "dedicated" to the utility. The remainder of the workspace (reference numeral 22b) is provided (but only when needed) by processor memory 20. Preferably, the overall workspace for the utility 14 is large enough to minimize processing time but the bulk of the workspace occupies storage in the file system itself. This enables the utility to operate efficiently without relying on large amounts of processor storage, even for very large file systems.

The file system 12 may be one of any of a number of known configurations, and the present invention is not to be construed as limited for use in any particular system configuration. One such configuration is defined by a root directory tree and a set of organizing data structures including data blocks, bit maps and so-called "inodes." An "inode" is a control structure (in a Unix-based file system) that represents a file, directory or link in the file system. In other file system configurations, this construct is sometimes referred to as a "fnode", "onode", "vnode" or the like. The term "inode" is used herein for exemplary purposes and should not be taken to limit the particular type of file system configuration in which the invention is implemented.

In the prior art, the file system check and repair utility workspace is prohibitively large for very large file systems. Moreover, as the size of a file system increases, execution time becomes unacceptable before the workspace exceeds available storage. This problem is primarily due to the need for excessive I/O to the disk containing the file system, which significantly decreases the performance of these known implementations. Specifically, in the prior art, each inode is read into storage twice. The present invention overcomes the problems associated with the prior art by utilizing the file system as a primary workspace and by avoiding the recursive traversal of the file system root directory. The improved implementation gets its performance boost by not reading the inodes at all while verifying the correctness of the root directory tree and connectedness of in-use inodes. It also eliminates the time required to allocate large amounts of processor storage for its workspace because the primary workspace is in the file system itself.

The improved implementation initially reads the inodes in inode number order, but it stores more information about the inodes in its workspace (as compared to prior schemes). The additional information saved in the inode workspace enables the inventive routine to verify the correctness of the root directory tree and that all in-use inodes are connected by reading the workspace inode table instead of the inodes themselves. In fact, the information in the workspace inode table is processed in inode order, which is quite efficient. According to the invention, the routine replaces a traversal of the inodes (which requires at worst one I/O for each inode and at best one I/O for each 32 inodes) for a traversal of the workspace inode table (which requires only one I/O for each 1020 inodes in a typical implementation).

When the file system is created at some size specified by the user, according to the invention sufficient file system storage is reserved for at least two (2) constructs: a workspace inode table 24 and a workspace block map 26 (as shown in FIG. 1). These two (2) tables in the file system workspace preferably increase in size with the size of the file system. In particular:

- the block map increases in proportion to the number of disk blocks in the file system
- A block map with one bit per block records block allocations in processing optimized for execution time. For a 1 terabyte file system, 256 megabytes are consumed by this map (assuming 512-byte blocks).
- The inode table increases in proportion to the number of files, directories, and links in the file system (each of which is represented in the file system by an inode.)
- Assuming an inode density ranging from the observed norm of 1 per 20 kilobytes to a default value of 1 per 4 kilobytes, the number of inodes in a 1 terabyte file system ranges from about 51 meg (53,477,376) to about 256 meg (268,435,456).
- An inode table with 16 bytes per inode can record the data necessary for processing optimized for execution time as will be described below. Using the estimates above, for a one terabyte file system, from 820 megabytes to 4096 megabytes (4 gigabytes) are consumed by this table.

Thus, for check and repair processing which minimizes execution time, a conservative estimate for the file system workspace needed to process a 1 terabyte file system is 1076 megabytes in size. When compared to the size of processor memory, the workspace map and table described above are prohibitively large. However, when compared to the size of the file system itself, they are trivial. Specifically, assuming a blocksize of 512 bytes and an inode population of one per 4096 bytes, this workspace consumes only 0.415% (or roughly 4 one-thousandths) of the file system.

Thus, according to the invention, the utility reserves this storage in the file system itself and uses processor storage only for, workspace items which do not increase with the size of the file system. If the file system is expanded or shrunk, the processing to satisfy the request also adjusts the amount of storage reserved for the workspace block map so that it is always in proportion to the size of the file system itself. Likewise, during the life of the file system, inodes are allocated and released as needed. The processing which handles this ensures that the control structures to manage the existing inodes are allocated, including the appropriately sized workspace inode table.

Figure 2:
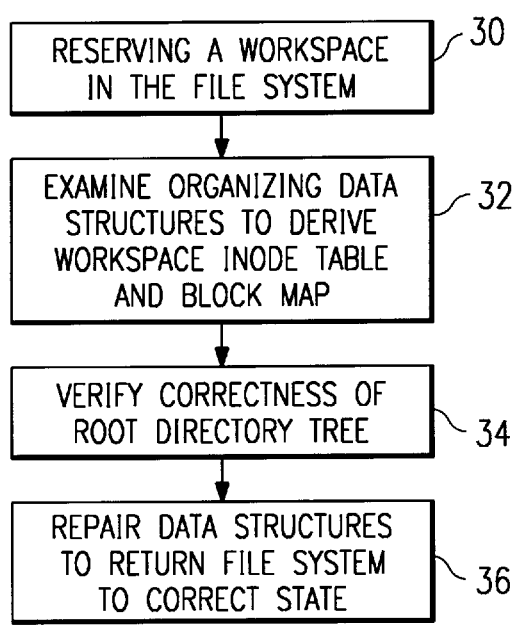
FIG. 2 is a flowchart of the basic operation of the file check and repair utility of the present invention

With the above as background, FIG. 2 illustrates a high level flowchart of the check and repair utility of the present invention. This utility provides a method of checking and repairing the file system 12 of the computer 10 upon a predetermined occurrence, such as a power outage, system boot-up or the like. Generally, the utility examines the integrity of the file system. If errors in the state of the file system are located, the utility attempts to fix them, if possible, to prevent further system anomalies when users begin using the system. The file system is defined by a root directory tree and a set of organizing data structures including inodes and data blocks. The method begins at step 30 by reserving a workspace in the file system for file system check and repair. This step has been previously described and typically occurs "off-line." Thereafter, it is assumed that some predetermined event has occurred necessitating running of the file system check and repair utility. Among things, this event may be a system panic or crash, system initialization, or even routine file system maintenance. At step 32, the routine examines the organizing data structures to determine a "current state" of the file system. The "current state" is defined or embodied in the workspace inode table 24 and the workspace block map 26, both of which are advantageously supported in the file system itself (as opposed to the processor memory). The workspace inode table identifies a status of each inode in the file system (i.e. whether the inode represents a file, a directory or a link), and the block map marks all data blocks containing data associated with the object represented by the inode in use. At step 34, the routine uses the workspace inode table to verify the correctness of the root directory tree and the connectedness of all in-use inodes. The root directory tree is "correct" if all forward and backward pointers are correct and internally consistent. In the prior art, this step has been accomplished by the time-consuming, I/O-intensive, processor-intensive technique of a recursive traversal through the tree. Step 34 avoids this process. At step 36, the method repairs any organizing data structures to return the file system to the known correct state.

The detailed operation of the file check and repair utility is set forth in the flowcharts of FIGS. 3–10. FIGS. 3–7 describe a five (5) phase operation of the utility, with the primary "check" operations being performed in phases 1–11 and the primary "repair" operations being carried out in phases III-V. It should be appreciated that the present invention may be implemented solely as a "check" utility, in which case the repair functions might be eliminated or carried out by some other functionality.

Figure 3:
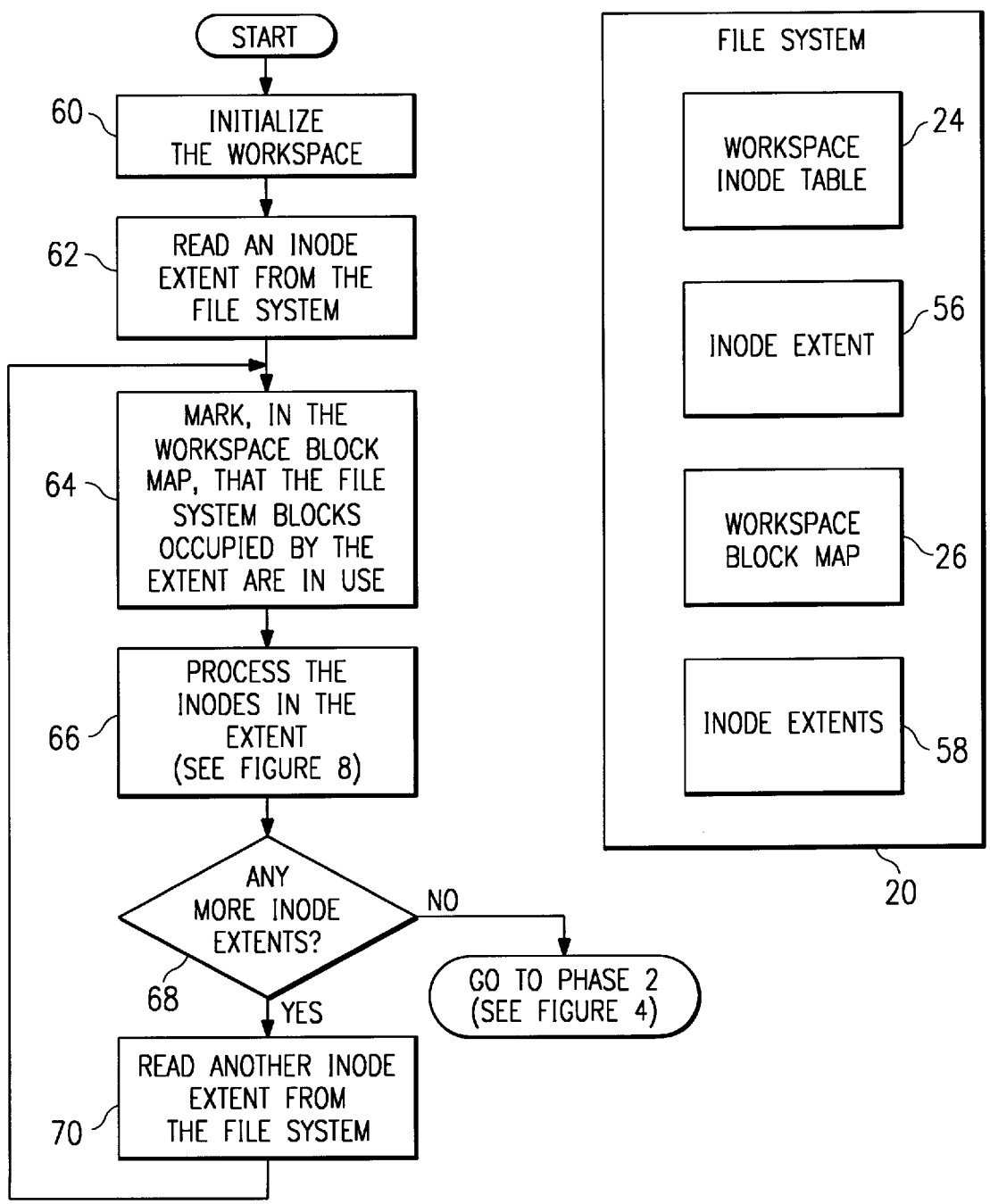
FIG. 3 is a flowchart of a first phase of the file check and repair utility for collecting information about file system inodes and block utilization.

FIG. 3 illustrates a flowchart of a file system information collection routine. This is sometimes referred to herein as phase 1. This routine collects information about file system inodes and about file system block utilization. During the processing of phase 1, the inodes are read in the order in which they were allocated. This processing is efficient, since only one I/O operation is needed for each inode extent. As noted above, an inode extent is an area of physical storage in which a group of inodes exist side-by-side, in order by inode number. The routine begins at step 60 to initialize a workspace in the file system 20 comprising a workspace inode table 24 and a workspace block map 26. As also discussed above, the file system 20 is a physical or logical storage device, and the workspace inode table 24 and workspace block map 26 are logical objects in the file system. They need not reside in contiguous storage and need not be in any particular order.

Their relative size as shown in FIG. 3 is merely for illustrative purposes. The file system 20 also includes two additional objects, referred to as an inode extent 56 or inode extents 58, which can occur anywhere in the file. Each inode extent occupies contiguous storage, and may or may not be contiguous with other inode extents.

The file system collection routine begins at step 60 to initialize the workspace. At step 62, the routine reads an inode extent from the file system 20. The routine then continues at step 64 and marks in the workspace block map 26 that the file system blocks occupied by the extent are in use. At step 66, the routine processes the inodes in the extent, which subroutine is described in detail in the flowchart of FIG. 8. A test is then performed at step 68 to determine if there are any more inode extents. If so, the routine reads another inode extent from the file system 20 at step 70 and returns to a point before step 64. If the outcome of the test performed at step 68 is negative, meaning that no more inode extents are left to be processed, the routine moves to a second phase illustrated in FIG. 4.

Figure 4:
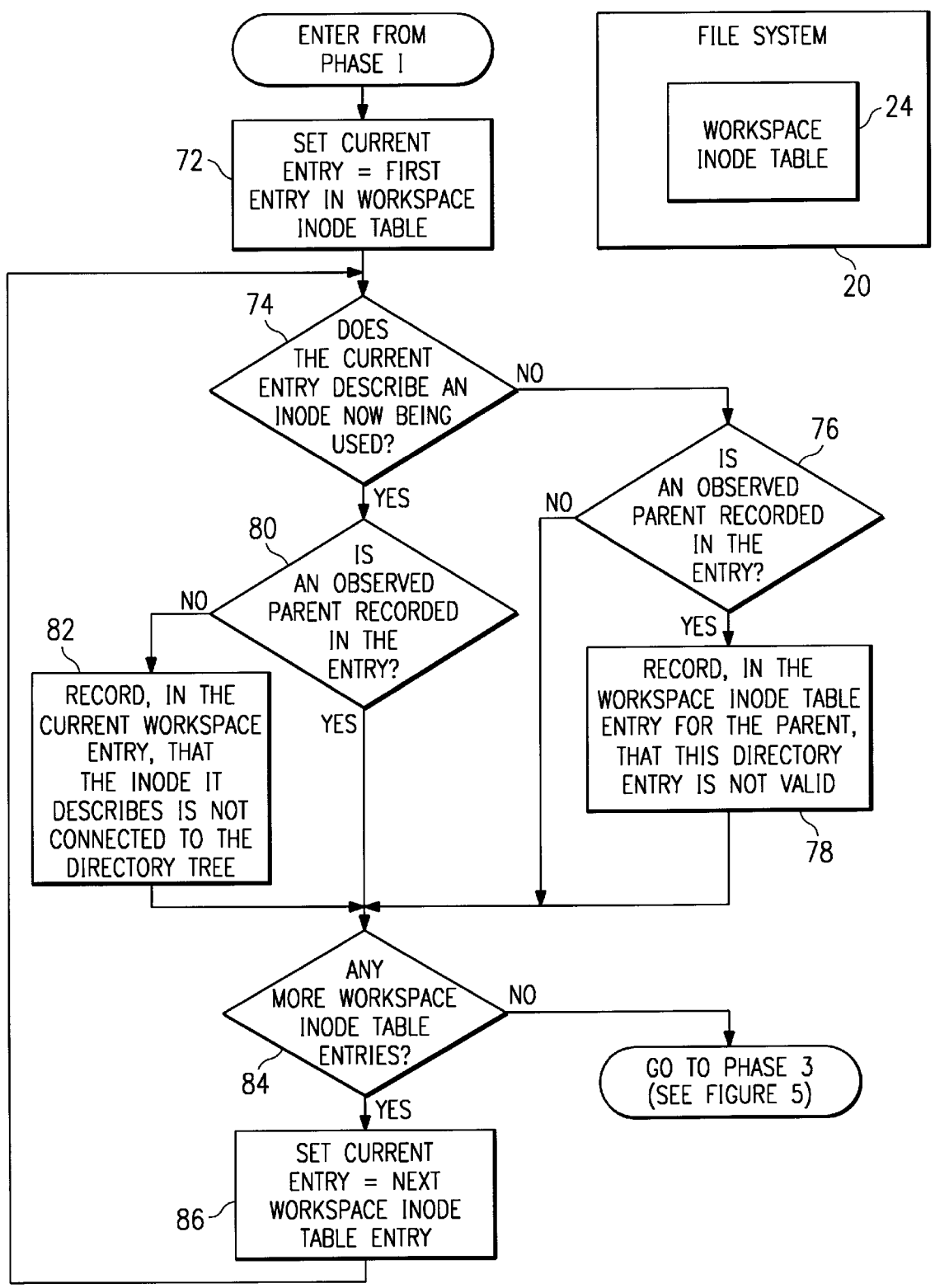
FIG. 4 is a flowchart of a second phase of the inventive utility for verifying directory structures in the file system.

Referring now to FIG. 4, the second phase of the routine verifies the file system directory structures. This is achieved without a recursive traversal of the root directory tree. The subroutine begins at step 72 by setting a "current entry" equal to the first entry in the workspace inode table 24. At step 74, a test is then made to determine if the current entry describes an inode now being used. If the outcome of the test at step 74 is negative, the subroutine performs a test at step 76 to determine if an observed parent node is recorded in the current entry. If the outcome of the test at step 76 is negative, the subroutine continues at step 84 to test whether there are any more entries in the workspace inode table 24. If the outcome of the test at step 76 is positive, the subroutine continues at step 78 to record, in the workspace inode table entry for the parent, that this directory entry is not valid.

If the outcome of the test at step 74 is positive, then another test is performed at step 80 to determine if an observed parent is recorded in the current entry. If not, the subroutine continues at step 82 to record, in the workspace inode entry, that the inode it describes is not connected to the directory tree. It the outcome of the test at step 80 is affirmative, or after the subroutine branches to and completes step 82, the subroutine continues at step 84 to test whether there are any more entries in the workspace inode table 24. If so, the subroutine sets the current entry to the next workspace inode table entry at step 86 and then returns for further processing just before step 74. On the other hand, if there are no more entries in the workspace inode table 24, the verification subroutine ends and the routine moves to a third phase illustrated in FIG. 5.

The third phase is a subroutine to correct damaged inodes. It begins at step 88 by retrieving the first entry in the workspace inode table 24 and setting this entry to be equivalent to a "current entry." At step 90, a test is made to determine whether the current entry describes an inode needing repair. If the outcome of the test at step 90 is positive, the subroutine continues at step 92 to update the inode. Step 92 is described in more detail in the flowchart of FIG. 10. If the outcome of the test at step 90 is negative, or after step 92 is carried out, the subroutine performs another test at step 94 to determine whether there are any more entries in the workspace inode table 26 that need to be checked. If the outcome of the test at step 94 is positive, at step 95 the subroutine sets the current entry to a next entry in the workspace inode table 26 and returns to just before step 90. If the outcome of the test at step 94 is negative, indicating that all entries in the workspace inode table 24 have been checked and repaired if necessary, the routine moves to a fourth phase illustrated in FIG. 6.

Figure 6:
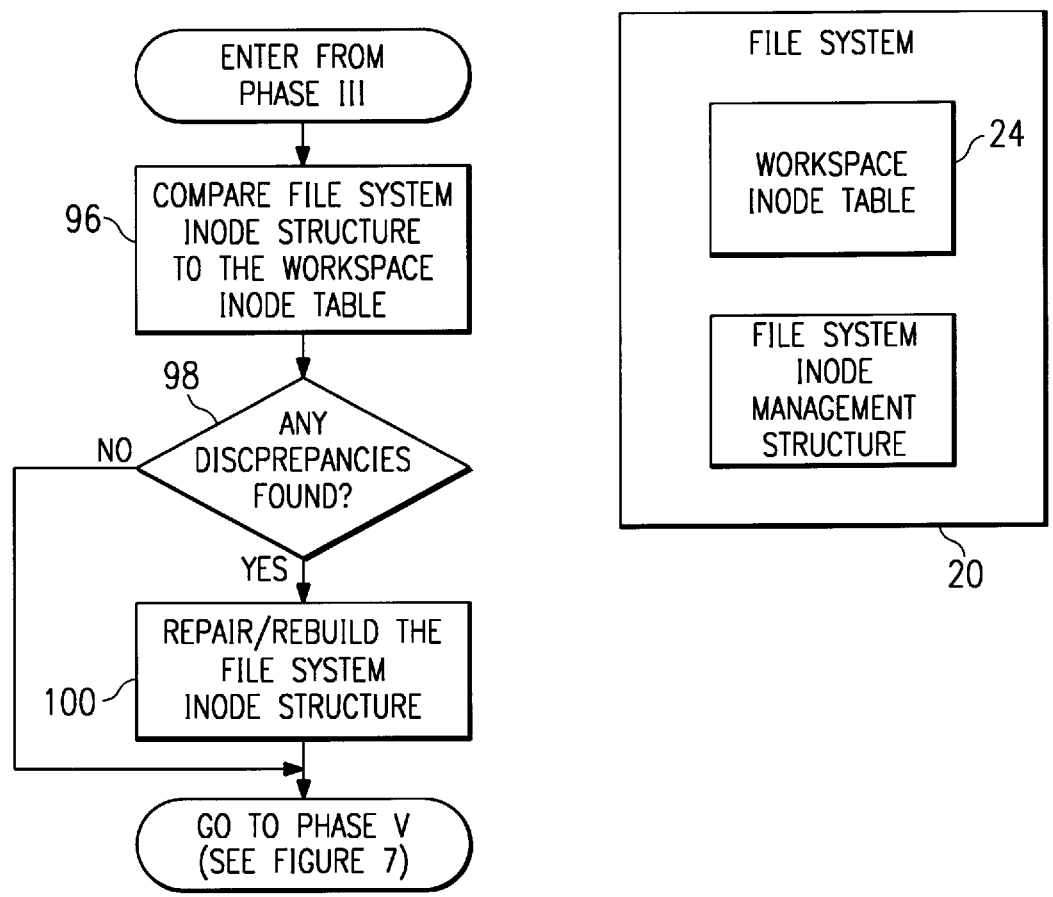
FIG. 6 is a flowchart of a fourth phase of the utility for verifying/repairing file system inode management structures.
Figure 7:
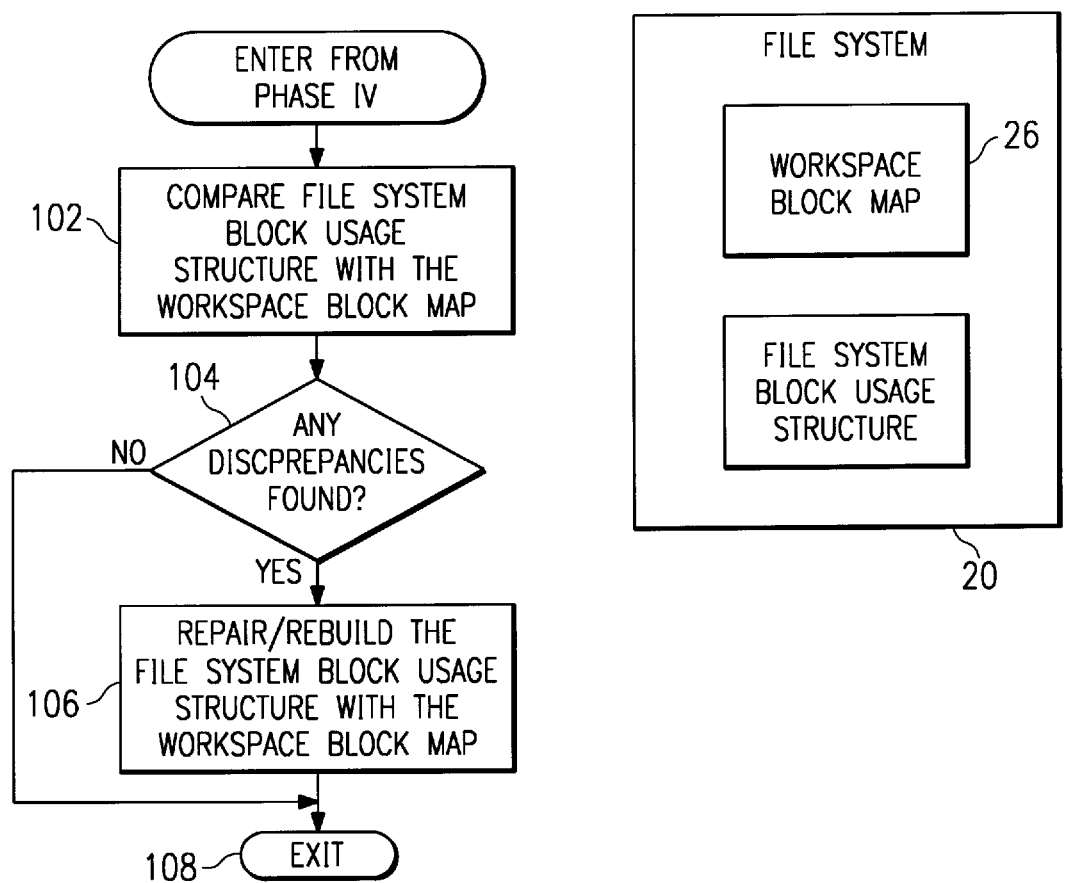
FIG. 7 is a flowchart of a fifth phase of the inventive file check and repair utility for verifying/repairing file system block usage structures.

FIG. 6 is a flowchart of a subroutine for verifying/ repairing file system inode management structure, sometimes referred to as a file system inode table. This structure is an allocation control structure that is created when the file system is created and that is updated whenever inodes are allocated and released. It is maintained on an on-going basis by the normal file system routines (i.e. file create, directory create, file read/write, file delete, etc.). The structure identifies which inodes are allocated and in use or allocated and not in use. The subroutine of FIG. 6 begins at step 96 by comparing the inode management structure to the workspace inode extent table 24. At step 98, a test is made to determine whether any discrepancies were found. If so, the subroutine continues at step 100 to repair or rebuild the file system structure as needed. If the outcome of the test at step 98 is negative, or after step 100, the subroutine continues on to a fifth phase illustrated in FIG. 7.

The fifth phase is a subroutine for verifying/repairing file system block usage structure. The block usage structure, sometimes referred to as a file system block map, is maintained by the file system on an on-going basis, just like the inode management structure as discussed above. The subroutine begins at step 102 by performing a comparison of the file system block map structure with the workspace block map 26. A test is then performed at step 104 to determine whether any discrepancies were found. If so, the subroutine continues at step 106 to repair or rebuild the file system block map structure using the workspace block map. If the outcome of the test at step 104 is negative, or after step 106, the routine terminates and exits at step 108. This completes the main processing loop of the file system check and repair utility.

Figure 8:
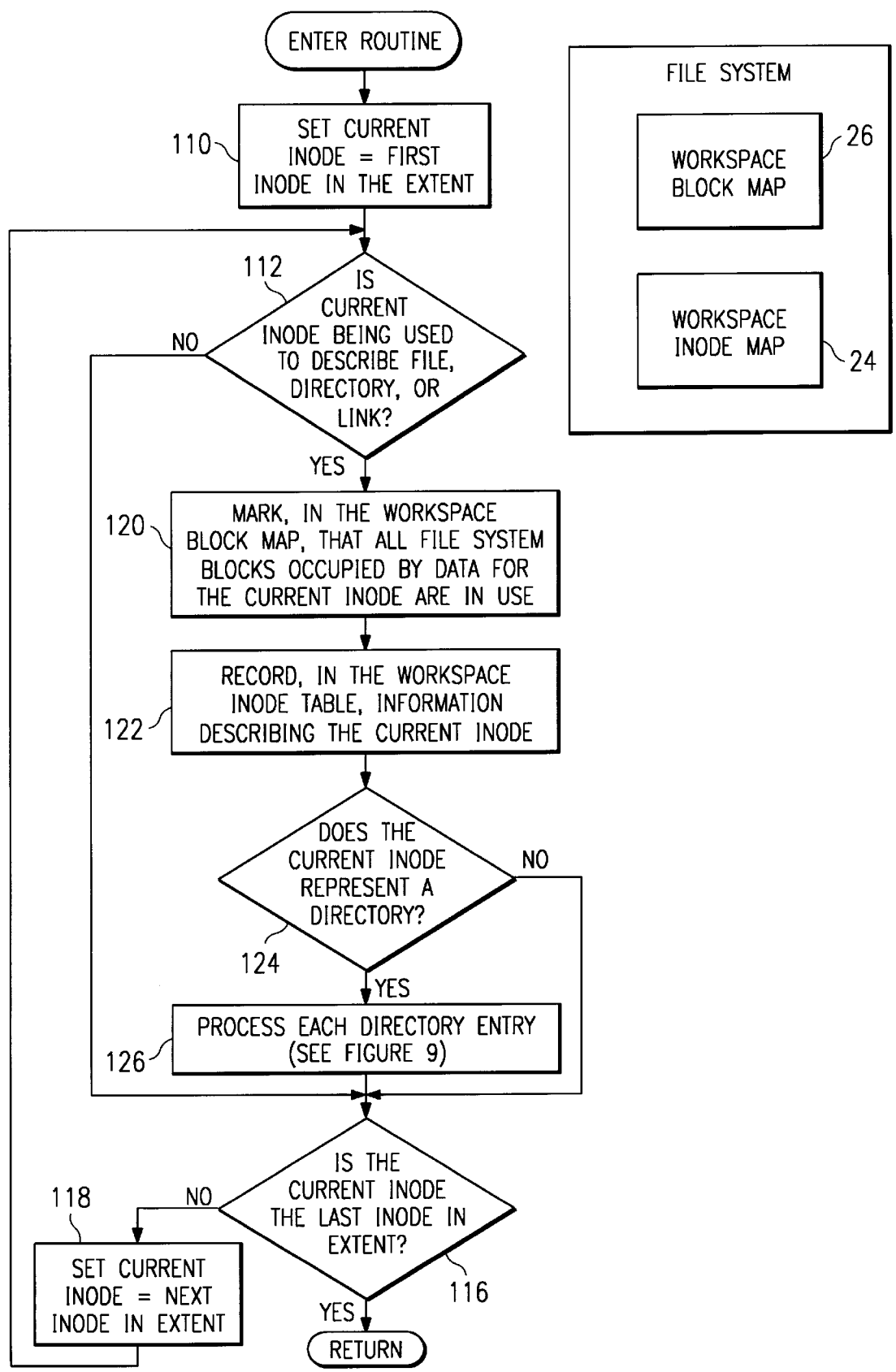
FIG. 8 is a flowchart of a subroutine for processing inodes in an inode extent as required in the first phase of the routine.

Turning now to FIG. 8, the subroutine for processing the inodes in an extent is described in detail. This was step 66 in FIG. 3. The subroutine begins at step 110 to set a first inode in the extent to the "current inode." At step 112, a test is performed to determine whether the current inode is being used to describe a file, a directory or a link. If the outcome of the test at step 114 is negative, a test is then performed at step 116 to determine whether the current inode is the last inode in the extent. If not, a step 118 is performed to set a next inode in the extent to the current inode and the subroutine returns back to step 112.

If the outcome of the test at step 112 is positive, however, the subroutine continues at step 120 to mark, in the workspace block map 26, that all file system blocks occupied by data for the current inode are in use. The routine then continues on at step 122 to record, in the workspace inode table 24, information describing the current inode. At step 124, a test is performed to determine whether the current inode represents a directory. If so, the subroutine continues at step 126 to process each directory entry. After step 126, which is described in the flowchart shown in FIG. 9, or if the outcome of the test at step 124 is negative, the subroutine continues at step 116 to determine whether the current inode is the last inode in the extent. If the outcome of step 116 is positive, the subroutine returns at step 128 (i.e. to step 68 in FIG. 3). If the outcome of step 116 is negative, the subroutine continues at step 118 to set the current inode to the next inode in the extent, and then returns to a point just before step 112.

Figure 9:
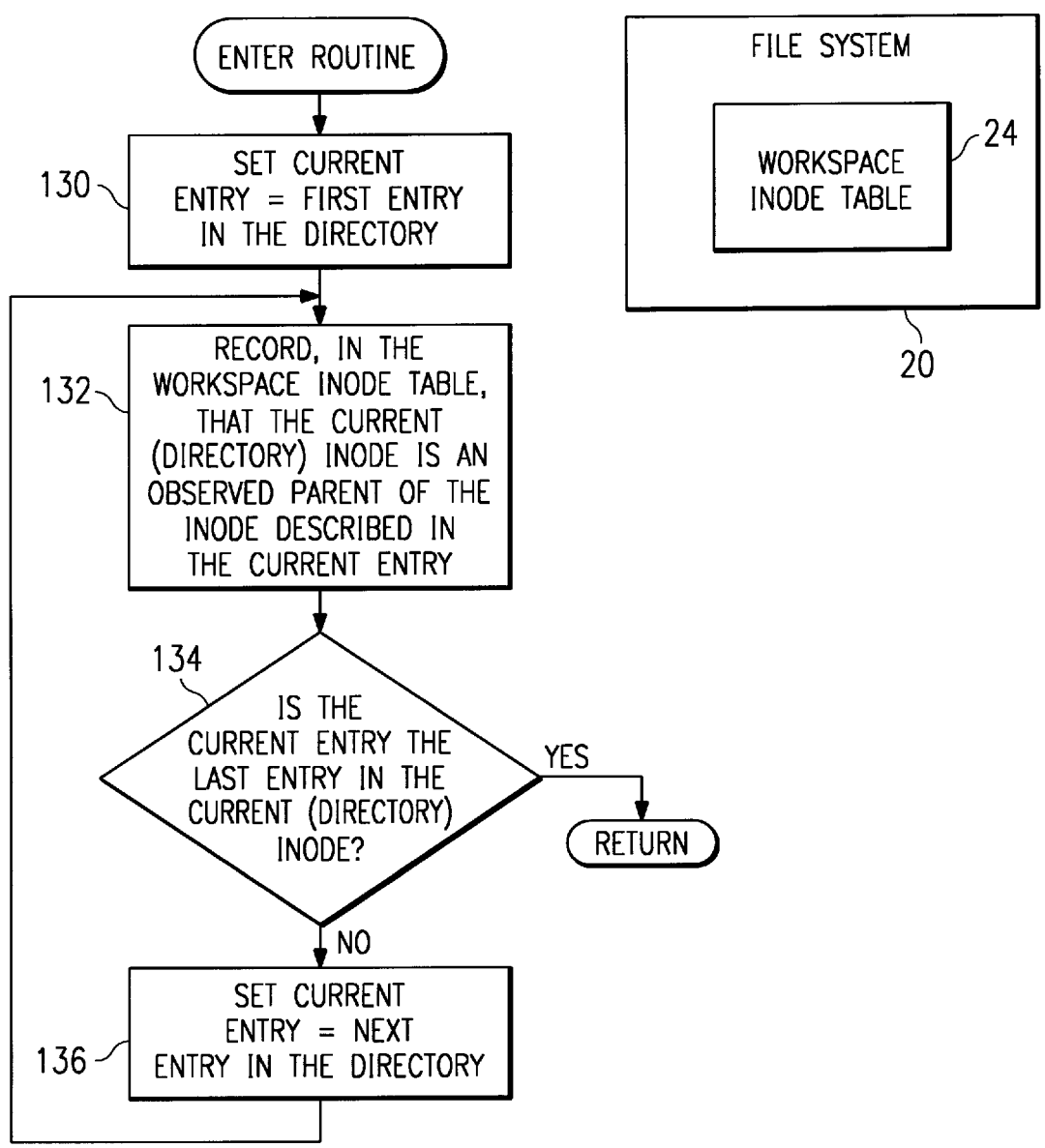
FIG. 9 is a flowchart of a subroutine for processing each directory entry during the inode processing subroutine of FIG. 8.

FIG. 9 illustrates a subroutine for processing each directory entry as provided in step 126 of FIG. 8. This subroutine begins at step 130 by setting the first entry in the directory equal to the current entry. At step 132, the subroutine records, in the workspace inode table 24, that the current (directory) inode is an observed parent of the inode described in the current entry. At step 134, a test is then made to determine whether the current entry is the last entry in the current (directory) inode. If no, the subroutine sets the current entry to the next entry in the directory at step 136 and returns to just before step 132. If the outcome of the test at step 134 is positive, the subroutine terminates and control is returned to step 116 in FIG. 8.

Figure 5:
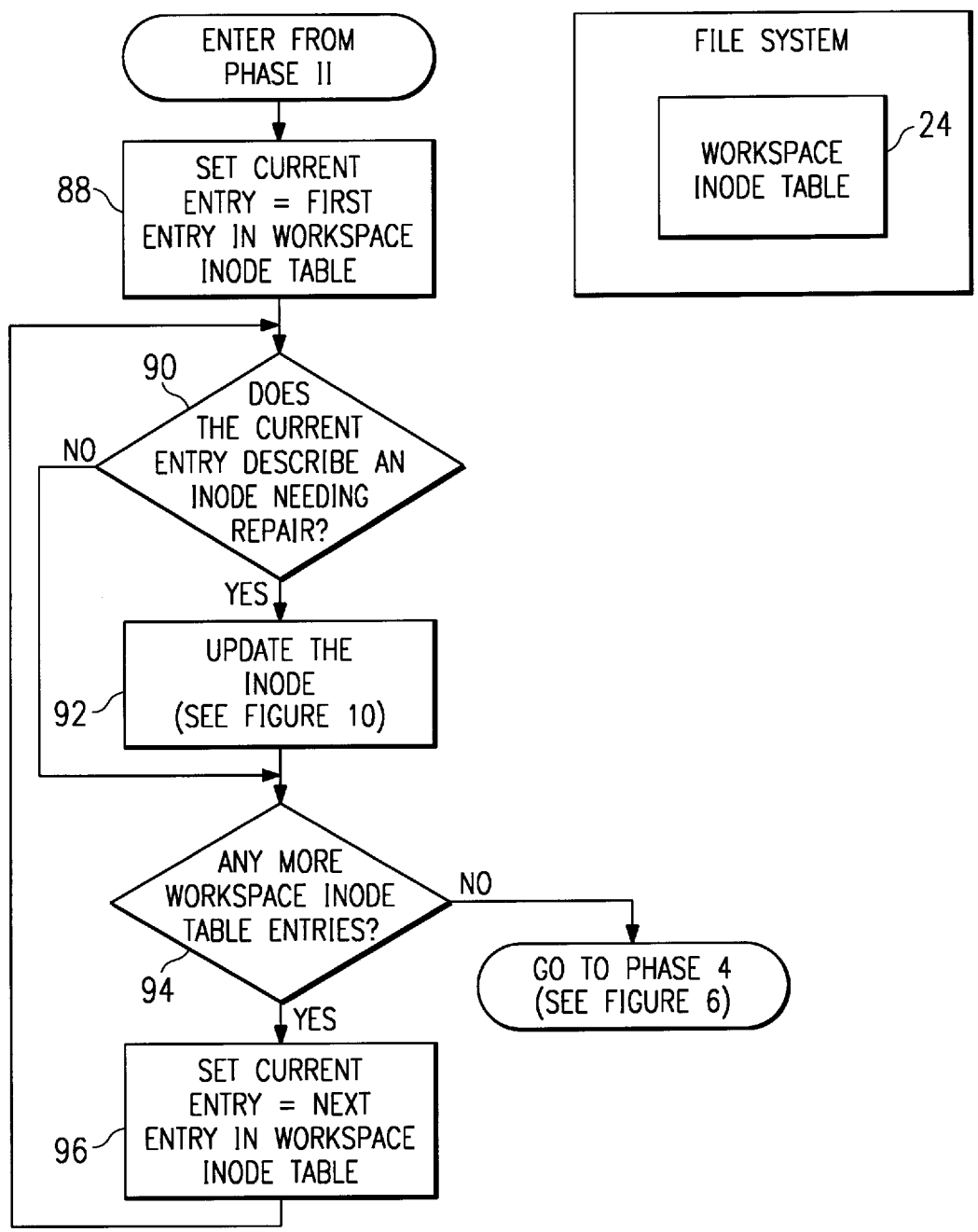
FIG. 5 is a flowchart of a third phase of the file check and repair utility for correcting damaged inodes.
Figure 10:
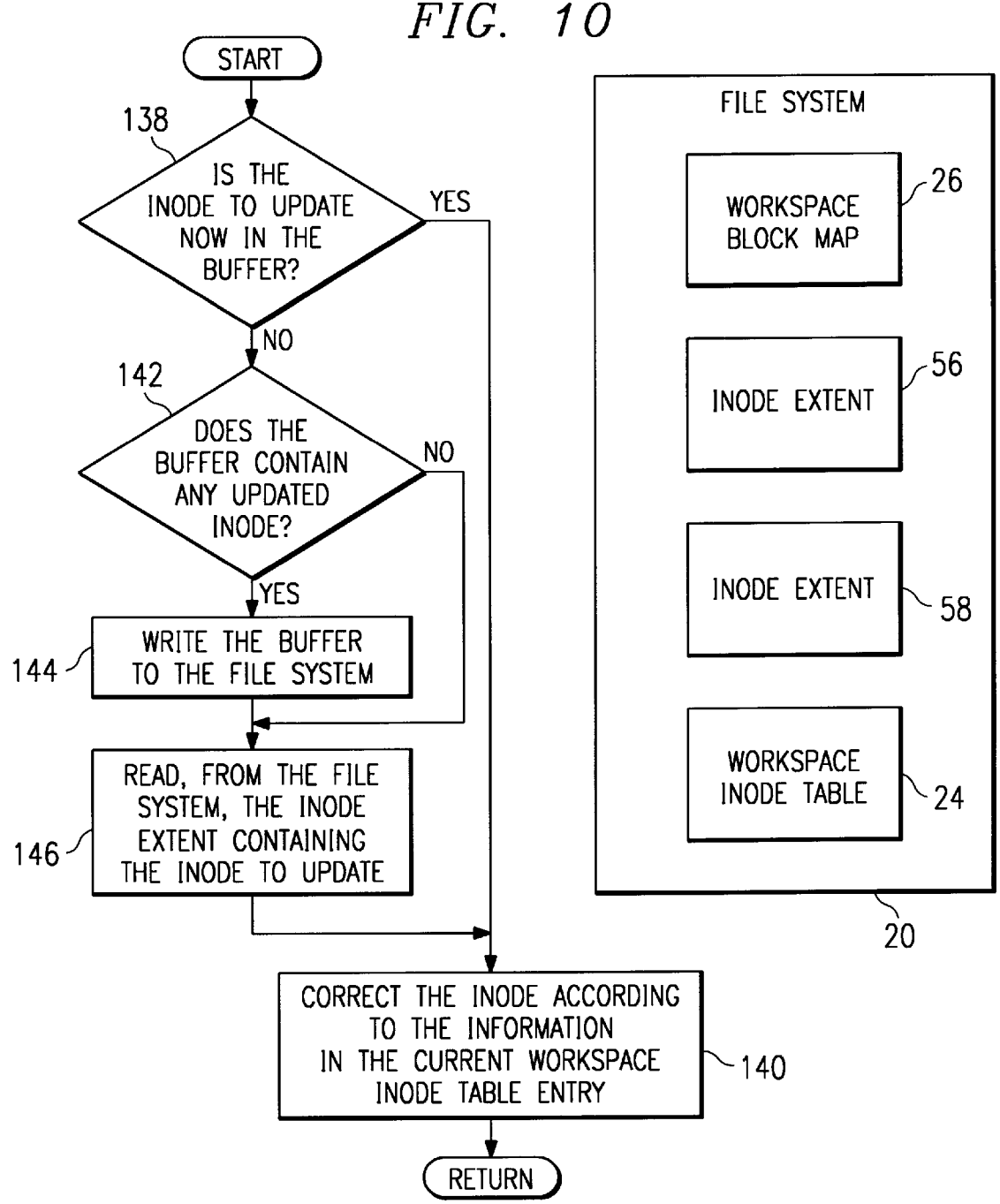
FIG. 10 is a flowchart of a subroutine for updating a particular inode as required in the third phase of the routine.

FIG. 10 is a subroutine for updating an inode, which is set 92 in FIG. 5. This subroutine begins at step 138 to test whether an inode to be updated is located in a buffer. If so, the subroutine continues at step 140 to correct the inode according to the information in the current workspace inode table entry. Thereafter, the subroutine returns to step 94 in FIG. 5. If the outcome of the test at step 138 is negative, a test at step 142 is then performed to determine whether the buffer contains any update inode. If so, the subroutine writes the buffer to the file system at step 144. IF the outcome of the test at step 142 is negative, or after step 144, the subroutine continues at step 146 to read, from the file system 40, the inode extent containing the inode to update. After step 146, the subroutine performs step 140 as previously described and then returns to step 94 in FIG. 5.

One of the preferred implementations of the file check and repair utility of the invention is as a set of instructions in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via a computer network. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific operating system environment, those skilled in the art will recognize that the invention can be practiced, with modification, in other and different operating system architectures with the spirit and scope of the appended claims. Thus, the use of the term "inode" should not be construed to limit the present invention to a Unix-based implementation. The invention is also useful in a DOS-based or other type of operating system, or even in a standalone file system having its own processor. As used herein and in the claims below, "inode" should thus be construed as a shorthand for any equivalent type of file system control structure such as "fnode" (in the DOS-based implementation). Moreover, the construct of an "inode table" or "block map" should not be taken as limiting either, as the words "map" or "table" should be broadly construed to cover any well-known data structures including linked lists. Thus, where the term "map" is used, the reference should broadly cover table or linked list constructs; likewise, where the term "table" is used, the reference should broadly cover map or linked list constructs, and so forth.

Also, the inventive utility may be implemented in a file system having its own processor.

Having thus described my invention, what I claim as new and desire to secure by letters patent is set forth in the following claims:

We claim:

1. A method of maintaining a file system of a computer in a known correct state, the file system defined by a root directory tree and a set of organizing data structures including inodes and data blocks, comprising the steps of:
   (a) reserving a workspace in the file system for file system maintenance;
   (b) upon a predetermined occurrence, examining the organizing data structures to determine and store in the workspace information reflecting a current state of the file system, the information including an inode table that identifies a status of each inode in the file system; and
   (c) using the inode table to verify the correctness of the root directory tree; and
   (d) adjusting the current state of the file system to the known correct state.

2. The method of maintaining a file system as described in claim 1 further including the step of adjusting the size of the workspace as the size of the file system changes.

3. The method of maintaining a file system as described in claim 1 wherein the information stored in the workspace also includes a block map of all data blocks of the file system that are in use upon the predetermined occurrence.

4. The method of maintaining a file system as described in claim 1 wherein the inode table identifies a state of each inode in the file system upon the predetermined occurrence.

5. The method of maintaining a file system as described in claim 1 wherein the step of adjusting the current state includes the step of correcting damaged inodes.

6. The method of maintaining a file system as described in claim 1 wherein the step of adjusting the current state includes the step of repairing inode management structures.

7. The method of maintaining a file system as described in claim 1 wherein the step of adjusting the current state includes the step of repairing block usage structures.

8. A method of checking and repairing a file system of a computer upon a predetermined occurrence, the file system defined by a root directory tree and a set of organizing data structures including inodes and data blocks, comprising the steps of:
   (a) reserving a workspace in the file system for file system check and repair;
   (b) examining the organizing data structures to determine and store in the workspace information reflecting a current state of the file system, the information including an inode table that identifies a status of each inode in the file system and a block map that identifies all data blocks in use; and
   (c) using the inode table to verify the correctness of the root directory tree and that all in-use inodes are connected; and
   (d) repairing any organizing data structures to return the file system to a known correct state.

9. The method of checking and repairing a file system as described in claim 8 further including the step of adjusting the size of the workspace as the size of the file system changes.

10. The method of checking and repairing a file system as described in claim 8 wherein the predetermined occurrence is a hard stop of the computer.

11. A method, using a computer, of checking a file system upon a predetermined occurrence, the file system having a dedicated workspace for file system checking, comprising the steps of:
    (a) examining organizing data structures of the file system to determine and store in the dedicated workspace information reflecting a current state of the file system, the information including a workspace inode table that identifies a status of each inode in the file system; and
    (b) using the workspace inode table to verify the correctness of a root directory tree of the file system.

12. A computer program product for use in a computer to facilitate file system check and repair, the computer including a file system having a workspace dedicated for file system checking, comprising:
    a computer-readable storage medium having a substrate; and
    program data encoded in the substrate of the computer-readable storage medium, wherein the program data comprises:
      means for examining organizing data structures of the file system to determine and store in the workspace information reflecting a current state of the file system, the information including an inode table that identifies a status of each inode in the file system; and
      means for using the inode table to verify the correctness of a root directory tree of the file system.

13. The computer program product as described in claim 12 wherein the program data further comprises:
    means for adjusting the size of the workspace.

14. The computer program product as described in claim 12 wherein the program data further comprises:
    means for repairing organizing data structures to return the file system to a known correct state.

15. A computer, comprising:
    a processor;
    an operating system;
    a file system having a workspace dedicated to file system checking and repair;
    a file check and repair utility, comprising:
      means for examining organizing data structures of the file system to determine and store in the workspace information reflecting a current state of the file system, the information including an inode table that identifies a status of each inode in the file system; and
      means for using the inode table to verify the correctness of a root directory tree of the file system.

16. The computer as described in claim 15 wherein the file check and repair utility further comprises:
    means for adjusting the size of the workspace.

17. The computer as described in claim 15 wherein the file check and repair utility further comprises:
    means for repairing organizing data structures to return the file system to a known correct state.

18. A computer file system having a root directory tree and a set of organizing data structures including a control structure, comprising:
    means for reserving a workspace in the file system to facilitate file system check and repair;
    means for examining the organizing data structures to determine and store in the workspace information reflecting a current state of the file system, the information including a table that identifies a status of each control structure in the file system; and
    means for using the table to verify the correctness of a root directory tree of the file system.

19. The computer file system as described in claim 18 wherein the control structure is an inode representing a file, directory or link in the file system.

* * * * *